Oct. 5, 1948.
W. LASAR
2,450,601
RECIPROCATING CARRIAGE FOR ENDLESS
BAND MEAT CUTTING MACHINES
Filed Feb. 24, 1945
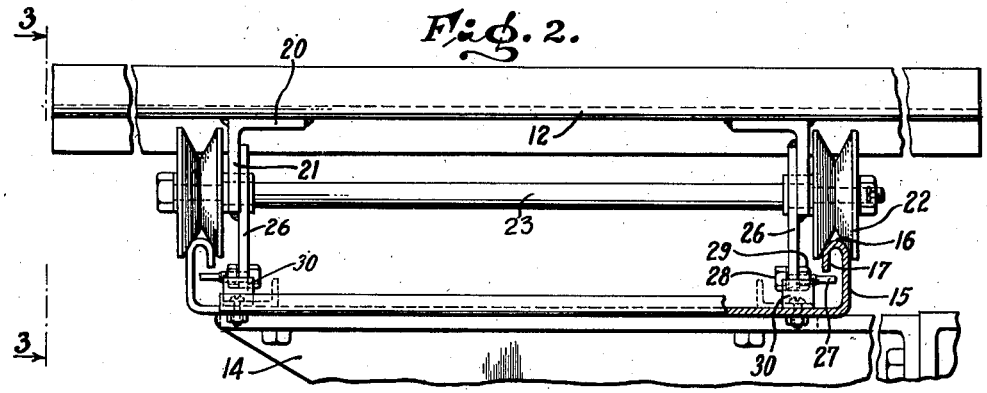
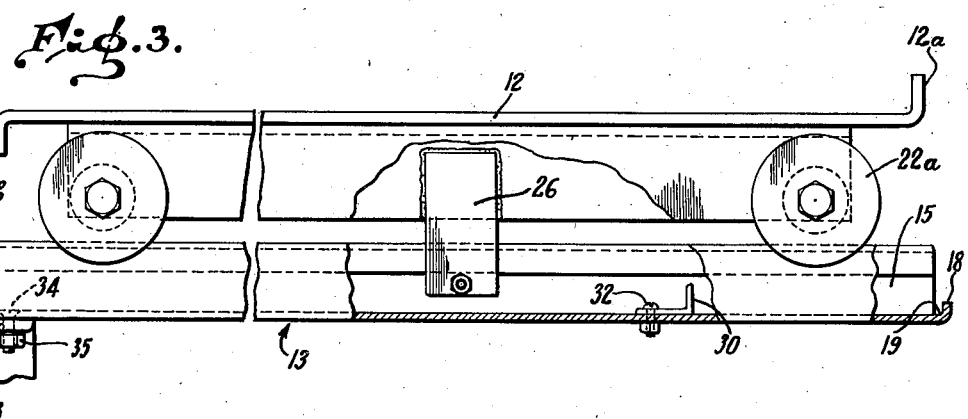
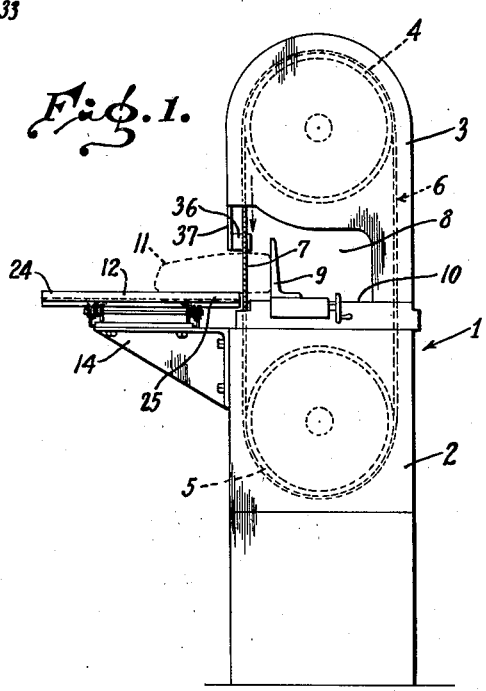
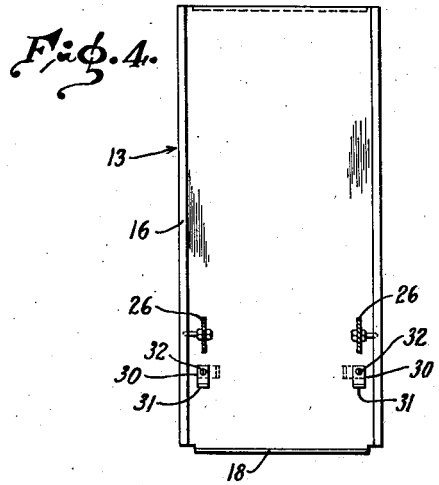
WILLIAM LASAR,
INVENTOR.
BY
ATTORNEY Patented Oct. 5, 1948

2,450,601

UNITED STATES PATENT OFFICE 2,450,601

RECIPROCATING CARRIAGE FOR ENDLESS BAND MEAT CUTTING MACHINES

William Lasar, Los Angeles, Calif.

Application February 24, 1945, Serial No. 579,618

1 Claim. (Cl. 146—88)

This invention relates to a movable table and supporting and guiding means therefor, to be employed as a part of a machine used by butchers to cut meat.

In the following specification the invention is described as applied to a machine adapted for cutting meat to any size, for example, when the butcher is filling orders for steak, chops or roasts.

In the operation of a machine of this kind the meat to be cut is usually supported on a table that carries the meat past a cutter, and in the machine presently to be described the cutter is in the form of a band saw which moves down in a vertical plane past the inner edge of the table. The movable table runs on a track and in practice the inner edge of the table presents a considerable overhang beyond the inner rail of the track. As the saw blade passes down through the meat, it of course encounters considerable resistance when cutting through bone and this imparts considerable downward pressure on the inner edge of the table that is supporting the meat close to the saw. This pressure of course, exerted as it is, on the over-hanging edge of the table, tends to lift the outer edge of the table off its rail.

An object of the present invention is to provide coordinated features of construction for the table and its supporting track which will enable the table to function in the usual way, but which will prevent the forces developed in cutting the meat from tipping the table out of its proper horizontal position.

Of course, in cutting fresh meat a considerable quantity of blood and juices from the meat flow down onto the table and the table support or "pan" above which the table is guided.

It is therefore one of the objects of this invention to construct the pan in such a way that it lends itself readily to being cleaned, and so that drainage is effected for the blood and meat juices from the table.

Another object is to provide coordinated features of construction for the table and the pan which will enable the table to be effectively guided to and fro while it is held down on its track on the table, and at the same time providing means for normally preventing the table from running off of the pan, though permitting the table when necessary to be slid off from above the pan for cleaning.

Another object of my invention is to provide a construction for the pan which will enable it to be manufactured as a stamping from sheet metal; and to provide rails and "holding-down" means to cooperate with the table, all embodied in an integral piece.

The invention consists in the novel parts and combination of parts to be described hereinafter, all of which contribute to produce an efficient moving table and support.

A preferred embodiment of the invention is described in the following specification, but the invention is not limited to this embodiment and the scope of the invention is pointed out in the appended claim.

In the drawings:

Fig. 1 is a side elevation of a butcher's cutting machine to which my invention is applied;

Fig. 2 is an enlarged view in side elevation of the moving table and its supporting means, certain parts being broken away and others shown in section. This view shows a portion of the brackets on which the table support is mounted;

Fig. 3 is an enlarged view in front elevation of the table support and table, certain parts being broken away and shown in section. This view particularly illustrates the preferred construction for the end of the pan, or table support, for providing drainage outlets from the area of the pan; and it further illustrates a movable stop mounted in the path of a part of the table and which normally prevents the table from running accidentally off the supporting rails; and Fig. 4 is a plan view upon a reduced scale compared to Figs. 2 and 3 of the table, and further illustrating the location and mode of operation of the movable stop.

Referring to the drawing, Fig. 1 indicates a butcher's cutting machine to which my invention has been applied. This machine has a lower housing 2 and an upper housing 3 for sheaves or pulleys 4 and 5, indicated in dotted lines, over which a band saw 6 runs. This saw presents teeth 7 on its edge. A suitable motor and connections for driving the saw 6 are employed, but as they do not concern the invention they are not illustrated.

The forward and lower portion of the upper housing 3 is cut away to form a deep throat 8 to permit the inner end of a piece of meat being cut off to have clearance when the same is being lined up to be applied to the blade of the saw 6. Opposite this throat 8 the machine is provided with an adjustable gauge 9 which extends out over the upper surface of a relatively fixed table or shelf 10. The distance of the forward face of this gauge from the forward run of the saw determines the thickness of the slice, steak or chop, or other piece of meat that is cut off from a body of meat. Such a piece is indicated by the dotted line 11 in Fig. 1.

The forward run of the saw moves downwardly as indicated by the arrow, and when cutting the meat it is supported on a movable table 12 that is guided to slide or roll past the saw or cutter 6. As illustrated, the teeth 7 are on the edge of the saw disposed toward the observer in Fig. 1 so that the meat would be cut by moving the table 12 away from the observer's position.

The supported portion of the cutting run of the saw 6 is backed up by a back stop or fin 36 that projects laterally from an extension 37 projecting down from the forward portion of the upper housing 3.

My moving table 12 and its support 13 are mounted at the forward side of the lower housing 2, and in the present instance are represented as supported by means of a plurality of angle brackets 14 bolted to the forward face of the lower housing. The table support 13, in accordance with my invention, is preferably constructed of sheet metal capable of being stamped in a metal stamping press to form the pan and track for the moving table. In order to accomplish this, the sides 15 of the blank from which this pan is formed are bent upwardly and then downwardly on the inner side as at 17 so as to form "semi-rolls" or rails 16.

At the end of the pan, disposed toward the observer in Fig. 1 I bend up the material to form a narrow lip 18 that extends transversely to the longitudinal axis of the table. This lip is unconnected to ends of the sides 15, so that at the end of the pan two oppositely disposed notches 19 will be presented to operate as drainage outlets.

The movable table 12 is of truck form, that is to say, the under side of the body of the table is provided with longitudinally extending stringers, preferably of angle cross section with horizontal portions 20 that are welded to the under side of the table body, and with vertical portions or webs 21 that extend downwardly.

In order to enable the table to run easily to and fro on the rails formed at 16, the table is mounted on four wheels 22 attached to transverse axles 23 carried by the vertical webs 21. The peripheral surfaces of the wheels are grooved to a V-shape which cooperates with the semi-circular shape of the track surface to center the wheels thereon.

The moving table is provided with means to cooperate with the flanges 17 to hold the table down and prevent it from being tilted upwardly at its forward or outer edge 24, that is, the edge of the table that is remote from the saw. In this connection, it should be observed that the inner edge 25 of the table presents a considerable overhang because its extreme edge must lie quite near the face of the saw blade. When the saw is cutting through heavy bone structure, considerable downward pressure will be developed against the overhanging edge 25 which, of course, tends to press this edge down and rock the table on the inner rail 16 so as to tilt up the outer edge 24. The holding means on the table or associated with the table prevents this from occurring.

In the present instance, in order to overcome this difficulty, I prefer to provide each of the side stringers under the table 12 with a downwardly projecting bracket 26 which in the present instance is in the form of a rectangular plate, the upper end of which is welded against the inner face of its corresponding web 21, and the lower portion of this bracket plate 26 is provided with a dog 27 which projects outwardly like a finger and extends under the lower edge of the flange 17 (see Fig. 2). This dog 27 may be in the form of a bolt whose head 28 is located on the inner face of the bracket plate 26, with the bolt body passing through a drilled or punched opening in the bracket plate. This bolt is locked in place by a clamping nut 29 seating against the outer face of the bracket plate. If desired, the threads on the bolt forming this dog 27 may be left intact, but in order to save cost of manufacture it is preferable to have the thread of the bolt machined, leaving the projecting portion of the bolt unthreaded.

The table support or pan 13 and the moving table 12 are preferably also provided with coordinated features operating to present a stop to prevent the table from being pulled forward too far accidentally, so that the pair of wheels 22a located toward the operator will not run off of their rails. I prefer to utilize the lower end of the bracket plates 26 as part of the means for accomplishing this, and accordingly I provide a pair of movable stops 30, attached to the body of the pan 13 adjacent to each side. The stops are attached in line with the bracket plates 26 (see Fig. 4), that is, the normal position of the stops present upwardly projecting flanges 31 in the path of movement of the bracket plates 26 and prevent the bracket plates from passing them. This, of course, stops the moving table.

The movable stop 30 is preferably in the form of an angle-clip, the body of which is attached by a pivot bolt or screw 32 to the upper face of the pan 13. In Fig. 4 I illustrate how this stop 30 can be rotated on its pivot bolt 32 through approximately 90°, and into a position such as indicated in dotted lines. This will remove the flange 31 out of line with the bracket plate and permit the moving table to be run off of the pan. However, in the normal operation of the machine, it should be understood that this stop 30 is in position to prevent this. When it is necessary to have complete access to the pan, the table can be run off of it, as suggested.

If desired, a lip similar to the lip 18 can also be provided at the other end of the pan. However, where it is desired to have the drainage all occur at one locality, the other end of the pan can be closed. This arrangement enables a single bucket to be hung on one end of the pan to catch the drippings when the pan is being washed.

Although I have shown the side rails in the form of semi-rolls 16 at their upper edges, it is obvious that if desired these rolls could each be in the form of an inverted V. This also would enable wheels with V-shaped grooves to be employed, if desired.

The pan 13 may be attached to the angle brackets 14 in any desired manner. In the present instance the means that I have illustrated includes bolts such as the bolt 33 having a countersunk head 34 received in a correspondingly formed hole in the pan, the lower end of each bolt being provided with a suitable clamping nut 35 to clamp the pan to the horizontal flanges of the angle bracket.

The body of the table 12 is in the form of a rectangular plate which is bent upwardly at its one end to form a pusher flange 12a. This flange takes the thrust of the meat when pushing the meat past the saw. The far end of the table may be provided with a similar flange 12b which, however, projects downwardly. The flanges also stiffen the table transversely. The upper face of the table 12 is, of course, substantially at the same level as the upper surface of the fixed table or shelf 10.

By forming the rails as upwardly and downwardly bent side edges of the same piece of sheet metal which is employed for the body of the table support, it will be apparent that the entire plate may be finished with a coating of glaze enamel which will permit the ready cleaning of the table support and tracks.

While I have shown and described the preferred embodiment of my invention, I do not desire to be limited to any of the details of construction shown and described herein, except as defined in the appended claim.

I claim:

In a meat cutting machine, a cutter supported in a relatively fixed position, a table support formed from a single piece of rectangular sheet metal and having its opposite sides turned upwardly and downwardly to form two parallel rounded track surfaces, a movable table having wheels on the lower surface thereof adapted to ride on said track, and a pan formed from said sheet metal table by turning up the other two edges of said table support, at least one of the ends of said last two edges being shortened to provide an outlet at the shortened portion.

WILLIAM LASAR.

REFERENCES CITED

The following references are of record in the file of this patent:

UNITED STATES PATENTS

| Number | Name | Date |
|---|---|---|
| 529,919 | Kingsley | Nov. 27, 1894 |
| 1,090,540 | Jacobs | Mar. 17, 1914 |
| 1,222,876 | Lewson | Apr. 17, 1917 |
| 1,346,470 | Schroeder | July 13, 1920 |
| 1,499,124 | Reichman | June 24, 1924 |
| 1,913,012 | Van Berkel | June 6, 1933 |
| 1,959,184 | Walker | May 15, 1934 |
| 1,975,032 | Winfree | Sept. 25, 1934 |

FOREIGN PATENTS

| Number | Country | Date |
|---|---|---|
| 284,642 | Great Britain | Feb. 21, 1929 |